United States Patent [19]

Teramo

[11] Patent Number: 4,486,937

[45] Date of Patent: Dec. 11, 1984

[54] TOOL FOR REMOVING AUTOMOBILE PARKING BRAKE CABLE

[76] Inventor: Armando Teramo, 17 Oak Pl., Inwood, N.Y. 11696

[21] Appl. No.: 367,913

[22] Filed: Apr. 13, 1982

[51] Int. Cl.[3] .............................................. B23P 19/04
[52] U.S. Cl. ...................................................... 29/268
[58] Field of Search ................. 81/5.1 R; 29/268, 227

[56] References Cited

U.S. PATENT DOCUMENTS

| | | | |
|---|---|---|---|
| 3,540,106 | 11/1970 | Goldman | 29/268 |
| 3,969,964 | 7/1976 | George et al. | 29/268 X |
| 4,041,740 | 8/1977 | Villazon | 81/5.1 R X |

*Primary Examiner*—Frederick R. Schmidt
*Assistant Examiner*—Steven P. Schad
*Attorney, Agent, or Firm*—Frishauf, Holtz, Goodman and Woodward

[57] ABSTRACT

The parking brake cable removing tool includes a prying device secured to one of the handle members of a locking pliers. The prying device has a lever arm that pivots with respect to the locking plier handle member to cause movement of a bifurcated end portion of the lever arm away from the clamping jaws of the locking pliers. In one embodiment of the invention the lever arm of the prying device is coextensive with the locking plier handle members. In another embodiment of the invention the prying device includes a fixed arm immovably secured to the locking pliers intermediate the locking plier handle member and the movable lever arm. The lever arm and fixed arm of the prying device extend a predetermined amount beyond the end portions of the locking plier handle members.

3 Claims, 6 Drawing Figures

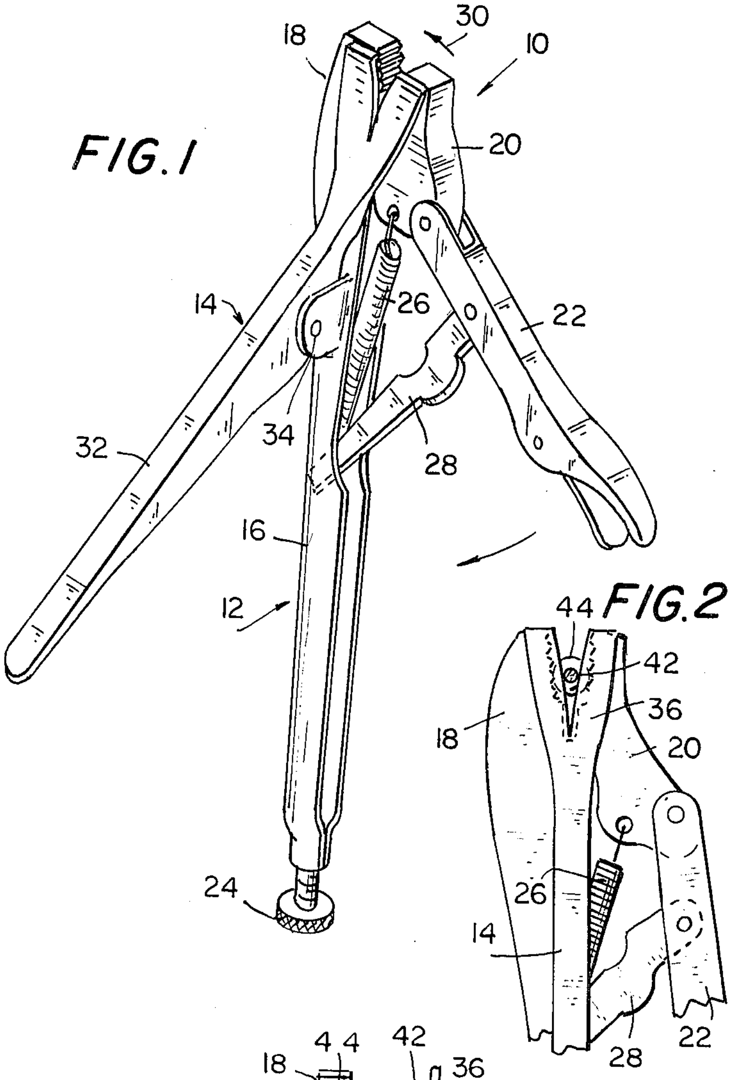
FIG. 1
FIG. 2
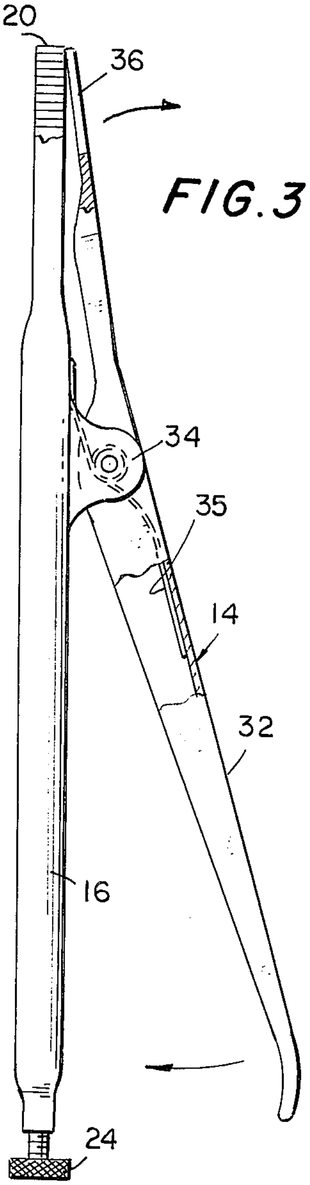
FIG. 3
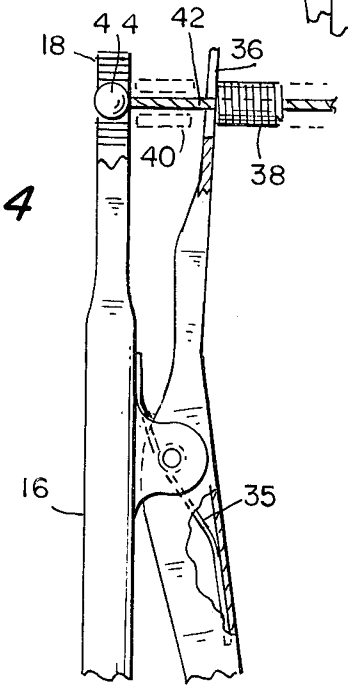
FIG. 4
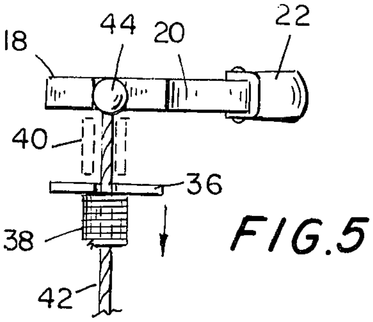
FIG. 5

TOOL FOR REMOVING AUTOMOBILE PARKING BRAKE CABLE

BACKGROUND OF THE INVENTION

This invention relates to tools for use on automobiles and more particularly to a tool for releasing a parking brake cable from a brake shoe assembly.

Parking brake systems in automobiles are a well known safety feature, and are usually actuated by pulling a brake handle or depressing a brake pedal into a detented position. In one type of conventional parking brake system, the handle or pedal movement causes a parking brake cable to shift a lever mechanism against a brake shoe to urge the brake shoe against the brake drum. When the parking brake is deactivated, the detent on the handle or pedal is released and a parking brake return spring disposed at an end portion of the parking brake cable urges the parking brake lever away from the brake drum. During replacement or repair of the brakes it is often necessary to remove the parking brake cable from the lever mechanism. This operation is usually tedious since the parking brake return spring, which is a helical spring surrounding the brake cable, and a ball-shaped stop piece at the end of the parking brake cable exert substantial compressive forces on the parking brake lever. These forces must be overcome in order to obtain removal of the parking brake cable. A typical removal procedure is to grip the stop piece with a locking pliers, and then force the return spring away from the opposite side of the parking brake lever with a prying tool. When there is clearance between the stop piece and brake lever, and the return spring and brake lever, the parking brake cable can be removed from the brake lever since the forces imposed thereon by the return spring and the stop piece are overcome.

The parking brake cable removing operation is generally difficult for one person to perform and is normally a two-man operation, with one person gripping the stop piece while another pries the return spring away from the parking brake lever. Occasionally, the forces necessary to remove the parking brake cable are imposed on the parking brake lever, causing damage to the lever or other parts of the brake assembly.

It is thus desirable to provide a tool which can be operated by one person to grip the stop piece and to pry the return spring away from the parking brake lever to permit removal of the parking brake cable therefrom without causing damage to the parking brake lever.

Among the several objects of the invention may be noted the provision of a novel tool having the combined features of a locking pliers and a prying tool, wherein the locking and prying functions can be performed by one person, and a novel tool wherein the prying function does not require manual gripping of the locking pliers. Other objects and features will be in part apparent and in part pointed out hereinafter.

SUMMARY OF THE INVENTION

In accordance with the invention, the parking brake cable removing tool includes a locking pliers and a prying device secured to one of the handle members of the locking pliers. The prying device has a lever arm with a bifurcated generally pointed blade-like end portion for partially collaring the parking brake cable. The lever arm is pivoted to, and biased away from the first handle member such that pivoting of the lever arm toward the first handle member causes movement of the bifurcated end portion away from the clamping jaws. Preferably, the lever arm of the prying member extends substantially to the free end portion of the locking plier handle members. This arrangement assures an efficient development of prying leverage when the lever arm and the locking plier handle members are gripped simultaneously to establish a prying force at the bifurcated end portion.

In another embodiment of the invention, the lever arm extends beyond the locking plier handle members. However, the prying device also includes a fixed arm immovably joined to the locking pliers intermediate the first handle member and the lever arm. The fixed arm and the lever arm extend beyond the end portion of the locking plier handle members and thus permit establishment of a prying force without gripping the locking plier handle members.

BRIEF DESCRIPTION OF THE DRAWINGS

FIG. 1 is a perspective view of a tool incorporating one embodiment of the present invention;

FIG. 2 is a fragmentary plan view thereof;

FIG. 3 is a side view thereof;

FIG. 4 is a fragmentary side view thereof, in operating position;

FIG. 5 is a top view thereof, in operating position; and

DETAILED DESCRIPTION

Figure 6:
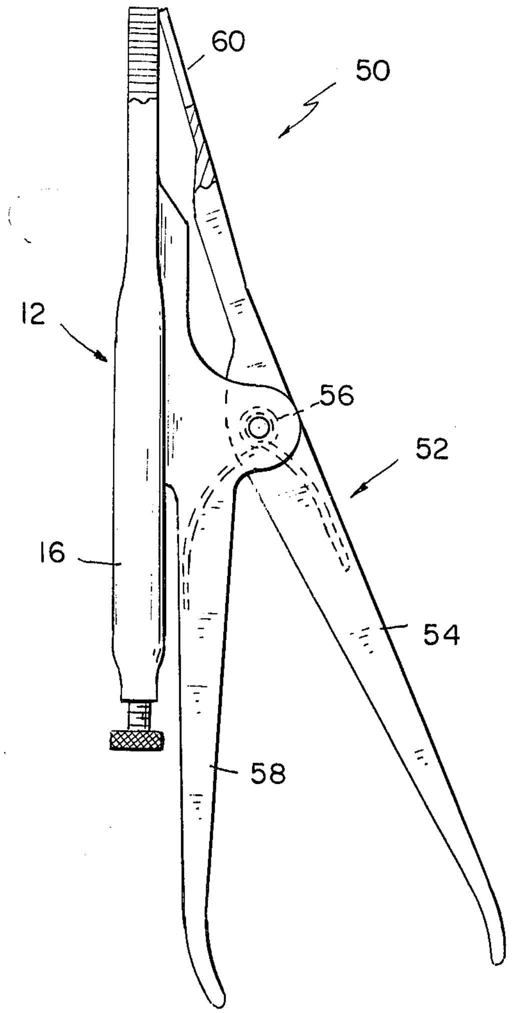
FIG. 6 is a perspective view of another embodiment of the invention.

Referring now to the drawings, a parking brake cable removing tool incorporating one embodiment of the invention is generally indicated by the reference 10 in FIG. 1. The tool 10 comprises a locking pliers 12, e.g., of the type sold under the trademark Vise-Grip, and a prying device 14 secured to a handle member 16 of the locking plier 12. A clamping jaw 18 is provided at one end of the handle member 16 and is opposed by a corresponding clamping jaw 20 on a handle member 22. The handle members 16 and 22 are of substantially equivalent extent.

An adjustment screw 24 on the handle member 16, a spring 26 connected to the jaw 20 on the handle member 16 hammer and an intermediate lever arm 28 having one end pivoted to the handle member 22 and an opposite end engaging the screw 24 operate in a well known manner to set the clamping jaws 18 and 20 to a predetermined position wherein the jaws 18 and 20 close and lock in a direction indicated by the reference 30.

The prying device 14 includes a lever arm 32 pivoted at 34 to the handle member 16. A bifurcated generally painted portion 36 is provided at one end of the lever arm 32 for movement toward and away from the clamping jaws 18 and 20. The portion of the lever arm on the opposite side of the pivot 34 from the bifurcated end portion 36 is an operating portion adapted to be manually operated. A biasing spring 35 is interposed between the lever arm 32 and the handle member 16 to normally urge the bifurcated portion 36 toward the clamping jaws 18 and 20. Preferably, the lever arm 32 is substantially coextensive with the handle members 16 and 22 as most clearly shown in FIG. 3.

As shown in FIG. 4, a parking helical brake cable spring 38 is arranged to bear against one end of a brake lever channel 40. The opposite end (not shown) of the cable spring 38 exerts a force on the parking brake cable 42 which pulls a ball-shaped stop piece 44 against the opposite end of the channel 40. The relationship between the helical return spring 38, the channel 40, the cable 42 and the stop piece 44 is well known in the art.

In operation of the tool 10 to remove the cable 42 from the channel 40, the bifurcated generally pointed blade-like end portion 36 of the prying device 14 is wedged between one end of the channel 40 and the return spring 38. The clamping jaws 18 and 20 of the locking pliers 12 are then set to grippingly and non-slippingly lock on the stop piece 44. The lever arm 32 of the prying device is pressed by the operator toward the handle members 16 and 22 to cause the bifurcated portion 36 to move away from the clamping jaws 18 and 20, in a direction substantially perpendicular to the direction in which the clamping jaws 18 and 20 are relatively movable, and thus force the cable spring 38 away from the channel 40, as seen in FIG. 4.

Advantageously the lever arm 32 and the locking plier handle members 16 and 22 can be simultaneously gripped to establish the prying force needed to pivot the lever arm 32. Moreover, since the clampng jaws 18 and 20 are locked onto the stop piece 44, equal and opposite forces are imposed on the stop piece 44 and the spring 38 to facilitate movement of the cable 42 in the channel 40. Under this arrangement no prying forces are imposed on the channel 40. Once the cable 42 and the stop piece 44 are spaced from the channel 40, the cable 42 can be easily lifted away from the channel 40 with the tool 10. It is of utmost importance that jaws 18, 20 lockingly and non-slippingly clamp onto stop piece 44. To this end, the clamping surfaces of jaws 18, 20 are preferably serrated or have other types of grip improving surface configurations.

In another embodiment of my invention as shown in FIG. 6, a tool 50 comprises a locking pliers and a prying device 52. The prying device 52 includes a lever arm 54 pivoted at 56 to a fixed arm 58, that is immovably joined to the handle member 16 of the locking pliers 12. A bifurcated portion 60, similar to the bifurcated portion 36, is provided at one end of the lever arm 54 for movement toward and away from the clamping jaws 18 and 20. However, the fixed arm 58 has no such corresponding bifurcated structure. The lever arm 54 and the fixed arm 58 extend a predetermined amount beyond the free ends of the locking plier handle members 16 and 22 at the operator's end for better leverage. In the FIG. 6 embodiment, the locking pliers 12 can be made smaller and shorter than the locking pliers in the embodiment of FIGS. 1-5 since the fixed arm 58 cooperates with the lever arm 54 to separate the stop piece 44 of the cable from the cable spring 38. This enables the device to be more economically manufactured.

The tool 50 of FIG. 6 is operated in a manner similar to that described for the tool 10. However, because the lever arm 54 and the fixed arm 58 extend beyond the handle members 16 and 22, there is no need to grip the locking plier handle members 16 and 22 to furnish a prying force that will move the bifurcated portion 60. Furthermore, since the lever arm 54 and the fixed arm 58 extend beyond the handle members 16 and 22, a greater prying leverage is obtainable from the tool 50 than would be available from the tool 10, and the lever arm 58 is more easily gripped than the locking pliers of FIGS. 1-5 to produce the prying force.

Various changes could be made in the above construction without departing from the scope of the invention.

What is claimed is:

1. The combination of an automotive power brake cable assembly (38, 40, 42, 44) including a coiled spiral spring (38), a parking brake cable (42) surrounded by the coiled spiral spring, a cable end stop piece (44) and a channel element (40) forming part of an automotive parking brake lever of an automotive brake shoe assembly, the channel being fitted between the end stop piece (44) and an end portion of the coiled spiral spring with a one-hand operable automotive tool for releasing the channel of the parking brake lever by freeing said channel from the spring, and for reinstalling the parking brake cable on the parking brake lever, wherein said tool comprises:

adjustable locking and gripping pliers (12), including a pair of adjustable clamping jaws (18, 20) movable in a first direction, said clamping jaws having serrated surfaces for engaging and locking onto said end stop piece (44) with said serrated surfaces contacting said end stop piece (44);

first and second handle members (16, 22) respectively extending from said clamping jaws and means (24, 28) on said pliers for setting and locking said clamping jaws in a locked position wherein said jaws close and fixedly lock on said end stop piece (44) of the parking brake cable without requiring a maintaining force between said handle members to maintain said locking of said clamping jaws on said end stop piece (44);

pivot means (34) fixedly mounted on said locking and gripping pliers (12); and a prying device (14) having a lever arm (32) pivoted relative to one of said handle members (16, 22) via said pivot means (34) and extending substantially coplanar to said one handle member, a bifurcated generally pointed blade-like portion (36) at one end of said lever arm engageable with the spiral coils of the coiled spring and an operating portion at the other end of said lever arm on the opposite side of said pivot means (34) from said bifurcated portion (36), said operating portion of said lever arm being substantially aligned with at least one of said handle members (16, 22) so as to be one-hand operable with said at least one handle member, said bifurcated portion (36) being in proximity of said clamping jaws (18, 20) for penetrating a spiral coil of the coiled spring and engaging a spiral coil of the spring (38) while the spiral coil is under compression and for movement away from said clamping jaws in a direction substantially perpendicular to said first direction when said operating portion of said lever arm (32) is manually pivoted toward said handle member (16) while said clamping jaws are locked onto said end stop piece (44) to separate said end stop piece (44) from said end of said spring (38) and permit movement of the channel (40) about the cable (42) free from pressure of the spring (38) without requiring a maintaining force between said handle members to maintain locking of said clamping jaws on said end stop piece;

a biasing means (35) interposed between said one of said handle members and said lever arm for normally urging said operating portion of said lever arm away from said one handle member whereby said bifurcated end portion is normally urged toward said clamping jaws, and a fixed arm (58) immovably joined to said locking pliers intermediate and substantially coplanar to said one handle member and said lever arm, wherein said fixed arm and said operating arm extend beyond said handle members to permit one-handed manual gripping of said fixed arm and said operating portion of said lever arm for pivoting said bifurcated portion of said lever arm away from said clamping jaws, while the locking pliers remain locked onto said end stop piece.

2. The combination of claim 1, wherein said lever arm (32) and said handle members (16) are substantially coextensive.

3. The combination of claim 1, wherein said pivot means (34) is integrally formed on said locking and gripping pliers (12).

* * * * *